(12) United States Patent
Perelli et al.

(10) Patent No.: US 10,261,606 B2
(45) Date of Patent: Apr. 16, 2019

(54) ELECTRONIC ASSEMBLY WITH EXPANDABLE INPUT DEVICE

(71) Applicant: Lenovo (Singapore) Pte. Ltd., New Tech Park (SG)

(72) Inventors: Thomas Perelli, Raleigh, NC (US); Ali Kathryn Ent, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 15/295,240

(22) Filed: Oct. 17, 2016

(65) Prior Publication Data

US 2018/0107327 A1    Apr. 19, 2018

(51) Int. Cl.
G06F 3/038    (2013.01)
G06F 3/0354    (2013.01)
G06F 1/16    (2006.01)

(52) U.S. Cl.
CPC .......... *G06F 3/03547* (2013.01); *G06F 1/169* (2013.01); *G06F 3/038* (2013.01)

(58) Field of Classification Search
CPC ............................ G06F 1/1601; G06F 3/03547
USPC ................................................. 345/156–184
See application file for complete search history.

(56) References Cited

U.S. PATENT DOCUMENTS

| 8,654,095 B1* | 2/2014 | Cho | G06F 3/0412 345/173 |
| 2003/0106724 A1* | 6/2003 | Masamitsu | G06F 1/1616 178/18.03 |
| 2005/0040753 A1* | 2/2005 | Osame | G06F 1/1616 313/500 |
| 2008/0252610 A1* | 10/2008 | Tracy | G06F 1/1616 345/173 |
| 2009/0315846 A1* | 12/2009 | Kim | G02B 6/0076 345/173 |
| 2010/0304793 A1* | 12/2010 | Kim | G06F 1/1675 455/566 |
| 2011/0175830 A1* | 7/2011 | Miyazawa | G06F 1/1643 345/173 |
| 2011/0199361 A1* | 8/2011 | Shin | G06F 1/1616 345/211 |
| 2012/0212437 A1* | 8/2012 | Kobayashi | G06F 1/1624 345/173 |
| 2013/0076591 A1* | 3/2013 | Sirpal | G06F 3/1438 345/1.3 |
| 2013/0169545 A1* | 7/2013 | Eaton | H04M 1/0241 345/173 |
| 2013/0169564 A1* | 7/2013 | Sano | G06F 1/1647 345/173 |
| 2015/0130738 A1* | 5/2015 | Park | G06F 3/1446 345/173 |

(Continued)

*Primary Examiner* — Carolyn R Edwards
(74) *Attorney, Agent, or Firm* — Dean D. Small; The Small Patent Law Group, LLC

(57) ABSTRACT

An electronic assembly includes an expandable input device having a display, different touch sensitive surfaces, and one or more processors. The input device transitions from a collapsed state having a first touch sensitive surface to an expanded state having a larger, second touch sensitive surface. The one or more processors detect touch of the touch sensitive surfaces of the input device and performing an operation based on the touch that is detected and display a result of the operation on the display.

19 Claims, 2 Drawing Sheets

(56) References Cited

U.S. PATENT DOCUMENTS

| | | | | |
|---|---|---|---|---|
| 2015/0227224 A1* | 8/2015 | Park | ................... | G06F 3/0487 345/173 |
| 2015/0227225 A1* | 8/2015 | Park | ................... | G06F 1/1641 345/173 |
| 2016/0085319 A1* | 3/2016 | Kim | ................... | G06F 3/0346 345/156 |

* cited by examiner

ELECTRONIC ASSEMBLY WITH EXPANDABLE INPUT DEVICE

BACKGROUND

Embodiments of the present disclosure generally relate to electronic assemblies and more particularly to input devices of the electronic assemblies that are able to be enlarged.

A wide variety of electronic assemblies are offered today. Examples of electronic assemblies include computers (e.g., laptop and desktop computers), electronic games, touch-screens, and the like. These assemblies may include input devices, such as touch sensitive surfaces that detect touches from a user or user-manipulated object (e.g., a stylus).

Some electronic assemblies have input devices with relatively small touch sensitive areas. For example, a laptop computer may have a relatively small area that a user can touch in order to control movement of icons or other indicia shown on a display of the computer. This area may be small due to the limited real estate that is available on or near a keyboard of the laptop computer. Small touch sensitive areas can present problems for some users. Users may set the sensitivity of the touch sensitive areas to a high sensitivity, which can make control of movement of the icons more difficult in small areas.

SUMMARY

In accordance with embodiments herein, an electronic assembly is provided that includes an input device having a display, different touch sensitive surfaces, and one or more processors. The input device transitions from a collapsed state having a first touch sensitive surface to an expanded state having a larger, second touch sensitive surface. The one or more processors detect touch of the touch sensitive surfaces of the input device, perform an operation based on the touch that is detected, and display a result of the operation on the display.

An input device is provided that includes first and second touch sensitive surfaces. The first touch sensitive surface detects touch of a user of an electronic assembly. The second touch sensitive surface is larger than the first touch sensitive surface and also detects touch of the user. The first and second touch sensitive surfaces transitioning from a collapsed state to an expanded state by moving the first touch sensitive surface relative to the first touch sensitive surface.

A method is provided that includes determining whether an input device of an electronic assembly is in a collapsed state or an expanded state, detecting touch of a user of the electronic assembly on a first touch sensitive surface of the input device responsive to determining that the input device is in the collapsed state, and detecting touch of the user of the electronic assembly on a larger, second touch sensitive surface of the input device responsive to determining that the input device is in the expanded state.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Figure 1:
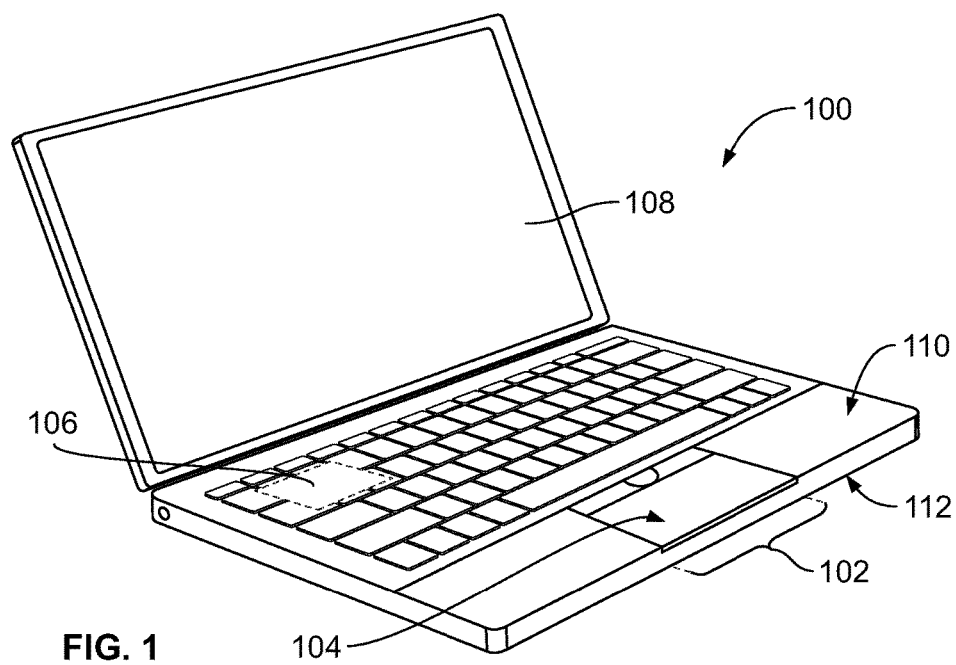
FIG. 1 illustrates a perspective view of an electronic assembly formed in accordance with an embodiment described herein.

FIG. 1 illustrates a perspective view of an electronic assembly 100 formed in accordance with an embodiment described herein. The assembly 100 includes an input device 102 that receives input from an operator or user of the assembly 100 by sensing touch of a surface 104 of the input device 102. The surface 104 may be an external surface of the input device 102 in that the surface 104 is visible and touchable by the operator or user of the assembly 100. The input device 102 may sense or detect touch of the surface 104 by the operator or user of the assembly 100. The assembly 100 may include one or more other input devices in addition to the touch sensitive input device 102. For example, the assembly 100 may include a keyboard or other touch sensitive input devices. While the electronic assembly 100 is shown as a laptop computer, alternatively, the assembly 100 may be one or more other types of electronic devices.

A processor 106 of the assembly 100 can receive electronic signals from the input device 102 that are representative of the touches of the surface 104 of the input device 102. The processor 106 represent one or more electronic devices of the assembly 100 and control operation of the assembly 100. For example, the processor 106 can represent one or more microprocessors, field programmable gate arrays, integrated circuits, or the like.

The processor 106 can perform various functions based on the detected touches of the operator on the external surface 104, such as moving one or more icons or other indicia shown on a display 108 of the assembly 100. The display 108 may be a light may be an electronic display, such as a liquid crystal display or other type of electronic monitor or display.

The assembly 100 includes an external housing 110 in which various components of the assembly 100 may be disposed. For example, a housing 110 may form the external surface or surrounding of the assembly 100, and may be the portion of the assembly 100 that is grasped or otherwise held by a user or operator in order to move, lift, or the like, the assembly 100. The housing includes external surfaces and edges, such as a forward facing edge 112. This edge 112 may be the external surface of the housing 110 that faces the user that employs the input device 102 to provide touch input to the assembly 100.

Figure 2:
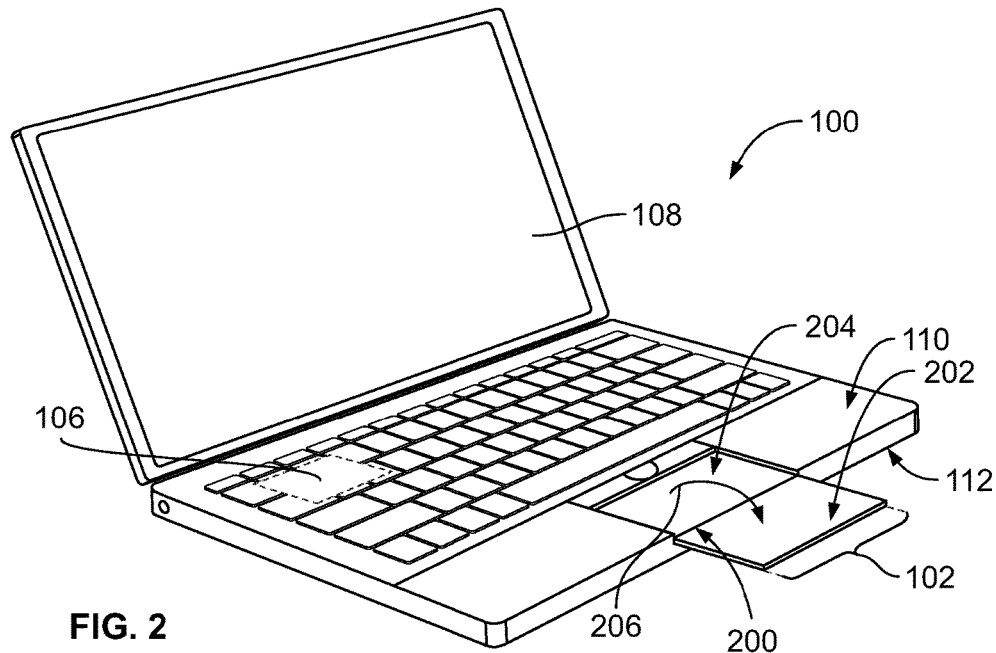
FIG. 2 illustrates a perspective view of the electronic assembly shown in FIG. 1 with an input device shown in FIG. 1 in an expanded state according to one embodiment described herein.

FIG. 2 illustrates a perspective view of electronic assembly 100 with the input device 102 in an expanded state according to one embodiment. The input device 102 of the assembly 100 can alternate between a collapsed state (shown in FIG. 1) and an expanded state (shown in FIG. 2). The input device 102 may convert from the collapsed state of FIG. 1 to the expanded state of FIG. 2 by flipping, pivoting, rotating, sliding, or opening the input device 102.

For example, the exposed or external surface 104 of the input device shown in FIG. 1 may be rotated away from the assembly 100 in a direction indicated by the arrow 206 shown in FIG. 2. This movement opens the input device 102 to the expanded state and causes the external surface 104 to face downward or face the surface on which the assembly 100 is resting. For example, the touch sensitive surface 104 of the input device 102 may be visible and exposed in the collapsed state shown in FIG. 1, but may rotate and be facing downward so that the surface 104 is no longer visible from above the housing 110 of the assembly 100 in the expanded state of the input device 102.

In one embodiment, the processor 106 of the assembly 100 deactivates or disregards touch input detected on the external surface 104 when the assembly 100 or when the input device 102 is an expanded state shown in FIG. 2. The processor 106 may ignore or turn off the external surface 104 of the input device 102 in the expanded state so that touches of the surface 104 of the input device 102 are not interpreted as user input when the assembly 100 is the expanded state.

The input device 102 includes one or more additional touch sensitive surfaces or sides that become exposed when the input device 102 is the expanded state. In the illustrated embodiment, these additional touch sensitive surfaces or sides are formed by touch sensitive surfaces 202, 204. These surfaces 202, 204 may be similar or identical to the touch sensitive surface or side 104 in that the surfaces 202, 204 can be used by the processor 106 to detect touch of the surfaces 202, 204 as user input. The processor 106 may receive signals from the input device representative of detected touches of one or more of the surfaces 202, 204 and control operation of the assembly 100 based on the signals, as described above in connection with the touch sensitive surface 104.

In the illustrated embodiment, the touch sensitive surfaces 202, 204 are separated from each other by an interface 200. This interface 200 may represent the location of a hinge or pivot line along which the input device 102 pivots or rotates to transition from the collapsed state shown in FIG. 1 to the expanded state shown in FIG. 2. Alternatively, the surfaces 202, 204 may not be separated by the interface 200.

The interface 200 may be coextensive with the edge 112 of the housing 110 of the assembly 100. Alternatively, the interface 200 may be located in another position relative to the edge 112 the housing 110. As shown in FIG. 2, the portion of the input device 102 that includes the touch sensitive area 202 projects out from or extends away from the housing 110 of the assembly 100 such that the touch sensitive surface 202 projects away from the facing edge 112 of the assembly 100.

Changing the input device 102 from the collapsed to the expanded state utilizes surfaces 202, 204 in a flat, tangent state (e.g., co-planar state) provides the assembly 100 with a much larger touch sensitive area in which an operator may use to touch and provide input. This can allow for the input device 102 to use a much higher touch sensitivity and/or may allow for greater user control over the location of an icon (for example, an arrow or cursor) on the display 108 relative to the smaller touch sensitive surface 104 of the input device 102 the collapsed state shown in FIG. 1.

The input device 102 may transition from the expanded state back to the collapsed state by rotating or pivoting the portion of the input device 102 that includes the touch sensitive surface 202 back toward the remainder of assembly 100. For example, a user may grasp the portion of the input device 102 that projects away from the edge 112 of the housing 110 and may rotate this portion of the input device 102 back toward the assembly 100. This movement can result in the touch sensitive surface 202 moving toward and optionally engaging or abutting the touch sensitive surface 204 of the input device 102. The processor 106 may deactivate or may disregard signals received from the input device 102 based on touches detected by either of the touch sensitive surfaces 202, 204 when the assembly 100 is in the collapsed state of FIG. 1.

Figure 3:
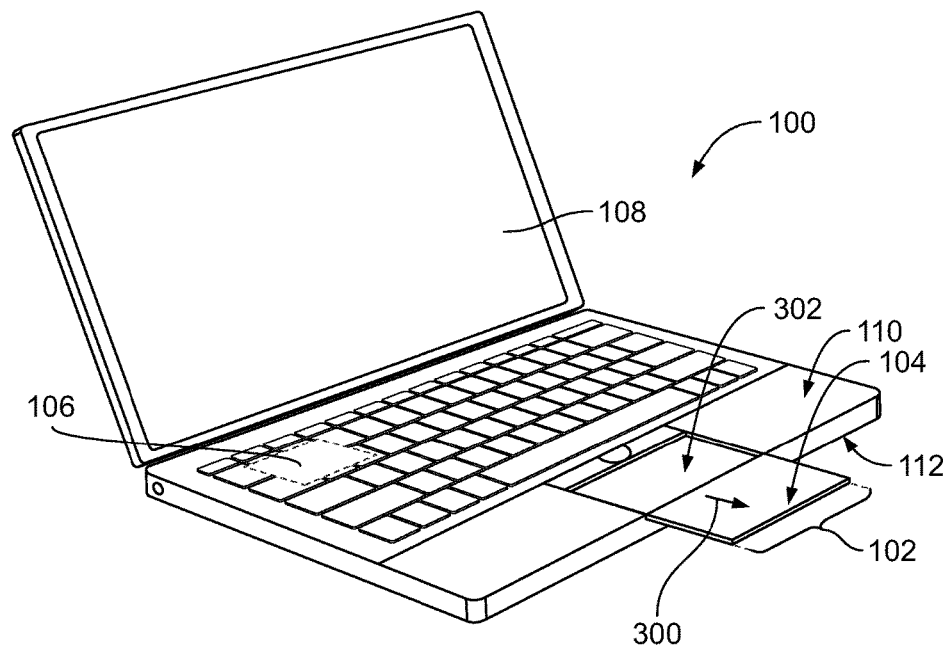
FIG. 3 illustrates another perspective view of the electronic assembly with the input device in an expanded state according to another embodiment.

FIG. 3 illustrates another perspective view of the assembly 100 with the input device 102 in an expanded state according to another embodiment. Instead of the input device 102 transitioning from the collapsed state to the expanded state by pivoting to opening similar to a clamshell style of opening, the input device 102 may transition to the expanded state by the portion of the input device 102 that includes the touch sensitive surface 104 being pulled away from the edge 112 of the housing 110 of the assembly 100.

A user may grasp the portion of the input device 102 that includes the touch sensitive area 104 and slide, pull, or otherwise move this portion of the input device away from the assembly 100, such as in the direction of the arrow 300 shown in FIG. 3. Actuating the input device 102 in this manner can cause the touch sensitive surface 104 to move away from the assembly 100 (for example, move away from the display 108) and project or stick out away from the assembly 100.

The input device 102 includes a lower touch sensitive surface 302 that is beneath the touch sensitive surface 104 when the input device 102 is in the collapsed state. This lower touch sensitive surface 302 becomes exposed responsive to the input device 102 transitioning to the expanded state, as shown in FIG. 3.

In the collapsed state shown in FIG. 1, the lower touch sensitive surface 302 may not be visible, external to, or available for detecting touch of a user or other component disposed outside of the assembly 100. Upon moving the touch sensitive surface 104 in the direction of the arrow 300, this lower touch sensitive surface 302 becomes exposed and available for detecting touch of a user of the assembly 100. The input device 102 then has both the touch sensitive area or surface 104 and the touch sensitive surface 302 available for being touched by a user of the assembly 100. In this condition, both surfaces 104 and 302 are level with each other. Similar to the embodiment of the input device 102 shown in FIG. 2, this provides for a much larger area for detecting touch of the user, and can provide for more accurate and increased control of the input device 102 by the user relative to smaller touch sensitive areas of other input devices.

The portion of the input device 102 that includes the touch sensitive surface 104 may project away from the housing 110 of the assembly 100 when the input device 102 is in the expanded state. For example, the portion of the input device 102 that includes the touch sensitive surface 104 may stick out from the housing 110 such that this portion of input device 102 projects away from the edge 112 the housing 110 and toward the user of the assembly 100.

While the input device 102 is shown and described above as transitioning to the expanded state by pivoting to open (for example, similar to a clamshell style opening) or by sliding a portion of the input device 102 out from the housing 110 of the assembly 100, other techniques may be used to increase the touch sensitive area of the input device 102. For example, the input device 102 may include a touch sensitive surface that rolls up into the housing 110, but may be expanded into the expanded state by unrolling this touch sensitive surface out from the housing 110. As another example, a touch sensitive surface of the input device 102 may rotate to pivot out from the housing 110, such as from along another edge or out from the edge 112 the housing 110.

Figure 4:
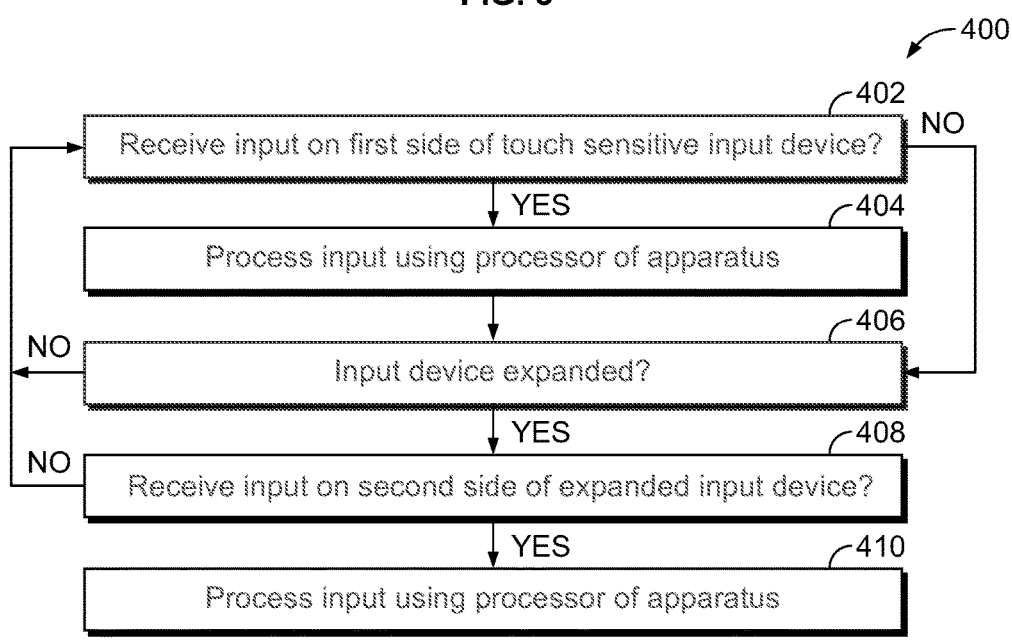
FIG. 4 illustrates a flowchart of one embodiment of a method for detecting input from an expandable touch sensitive input device.

FIG. 4 illustrates a flowchart of one embodiment of a method 400 for detecting input from an expandable touch sensitive input device. The method 400 may be performed by one or more electronic components of the assembly 100 shown in FIGS. 1 through 3, such as by the processor 106 of the assembly 100.

At 402, a determination is made as to whether or not input is received on a first side of a touch sensitive input device. For example, the processor 106 may determine whether or not signals are being received from the input device 102 indicative of user touch of a touch sensitive surface (for example, the surface 104) when the input device 102 is in the collapsed state. If the input device 102 is providing signals to the processor 106 indicative of user touch of the touch sensitive surface 104 with the input device 102 being in the collapsed state, the processor 106 may need to perform some operation or operations based on this input. As a result, flow of the method 400 may proceed from 402 toward 404. On the other hand, if the processor 106 is not receiving signals from the input device 102 that indicate user touch of the external surface 104 while the input device 102 is in the collapsed state, the processor 106 may not need to perform operation or operations based on this absence of user touch as input. As a result, flow the method 400 can proceed from 402 toward 406.

At 404, the input provided from the operator by touching the touch sensitive surface of the input device in the collapsed state is processed by the processor 106 of the assembly 100. For example, if the input indicates that the user has touched the touch sensitive surface 104 of the input device 102 in a left to right direction, the processor 106 may move one or more icons or other indicia shown on the display 106 in a similar left to right direction. As another example, if the input indicates selection of an icon or image shown on the display 108, then the processor 106 may highlight or change the appearance of the selected icon or image display 108.

At 406, a determination is made as to whether or not the input device has been expanded. This determination may be made based on one or more signals received by the processor 106 from the input device 102. For example, the input device may generate a signal that is conducted or communicated to the processor 106 responsive to a user changing a state of the input device from the collapsed state to the expanded state, and/or responsive to the user changing the state of the input device 102 from expanded state to the collapsed state. Responsive to receiving the signal, the processor 106 may determine that the input device 102 has transitioned from the collapsed state to the expanded state or from the expanded state of the collapsed state, as appropriate. If the input device 102 has been expanded from the collapsed state to the expanded state, and flow of the method 400 can proceed from 406 toward 408 otherwise, flow of the method may proceed from 406 back toward 402.

At 408, a determination is made as to whether or not input is received on a second side of a touch sensitive input device. For example, the processor 106 may determine whether or not signals are being received from the input device 102 indicative of user touch of a larger touch sensitive surface (for example, an area that includes the surfaces 202, 204 in one embodiment or the surfaces 104, 302 in another embodiment) when the input device 102 is in the expanded state. If the input device 102 is providing signals to the processor 106 indicative of user touch of this larger touch sensitive area with the input device 102 being in the expanded state, the processor 106 may need to perform some operation or operations based on this input. As a result, flow of the method 400 may proceed from 408 toward 410. On the other hand, if the processor 106 is not receiving signals from the input device 102 that indicate user touch of the larger touch sensitive area while the input device 102 is in the expanded state, the processor 106 may not need to perform operation or operations based on this absence of user touch as input. As a result, flow the method 400 can proceed from 408 back toward 402.

At 404, the input provided from the operator by touching the larger touch sensitive area of the input device in the expanded state is processed by the processor 106 of the assembly 100. For example, if the input indicates that the user has touched the larger touch sensitive surface of the input device 102 in a left to right direction, the processor 106 may move one or more icons or other indicia shown on the display 106 in a similar left to right direction. As another example, if the input indicates selection of an icon or image shown on the display 108, then the processor may highlight or change the appearance of the selected icon or image display 108.

In the embodiments shown and described herein, the touch sensitive surfaces of the input device 102 may be separate from and not part of the display 108. For example, the touch sensitive surfaces 104, 202, 204, 302 of the input device 102 may not electronically display information. Alternatively, one or more of the touch sensitive surfaces 104, 202, 204, 302 may electronically display information. For example, one or more of the touch sensitive surfaces 104, 202, 204, 302 may be a touchscreen.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to, wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An apparatus comprising:
  a display;
  a pivoting input device having different first and second non-display, touch sensitive surfaces disposed on opposite sides of the input device, the input device transitioning from a first state where the first non-display touch sensitive surface is active to detect touch to a second state where the second non-display touch sensitive surface is active to detect touch;
  wherein the second non-display touch sensitive surface is pivoted to a position adjacent to a third non-display touch sensitive surface, when the input device transitions to the second state, to provide a larger touch sensitive area relative to a touch sensitive area of the first non-display touch sensitive surface when the input device is in the first state; and
  one or more processors that detect touch of the first, second, and third non-display touch sensitive surfaces of the input device, perform an operation based on the touch that is detected, and direct the display to present a result of the operation.

2. The assembly of claim 1, further comprising an external housing in which the one or more processors are disposed, the input device having a portion that projects out from the housing while the input device is in the second state.

3. The assembly of claim 1, further comprising an external housing in which the one or more processors are disposed, wherein the input device transitions from the first state to the second state in response to a pivot of the first non-display touch sensitive surface of the input device away from the housing.

4. The assembly of claim 1, wherein the second non-display touch sensitive surface of the input device does not include the first non-display touch sensitive surface of the input device.

5. The assembly of claim 1, wherein the one or more processors ignore detected touch of the first non-display touch sensitive surface of the input device while the input device is in the second state.

6. The assembly of claim 1, wherein the one or more processors ignore detected touch of the second non-display touch sensitive surface of the input device while the input device is in the first state.

7. An input device comprising:
a pivoting first non-display touch sensitive surface that detects touch of a user of an electronic assembly without electronically displaying information;
a pivoting second non-display touch sensitive surface on an opposite side of the first non-display touch sensitive surface, the second non-display touch sensitive surface also detecting touch of the user without electronically displaying information, wherein the first and second non-display touch sensitive surfaces transition from a first state to a second state in response to a movement of the first non-display touch sensitive surface; and
a third non-display touch sensitive surface, wherein the second non-display touch sensitive surface is pivoted to a position adjacent to the third non-display touch sensitive surface, when the input device transitions to the second state, to provide a larger touch sensitive area relative to a touch sensitive area of the first non-display touch sensitive surface when the input device is in the first state.

8. The input device of claim 7, wherein the first non-display touch sensitive surface projects out from an external housing of the electronic assembly while the first and second non-display touch sensitive surfaces are in the second state.

9. The input device of claim 7, wherein the first and second non-display touch sensitive surfaces transition from the first state to the second state in response to a pivot of the first non-display touch sensitive surface away from an external housing of the electronic assembly.

10. The input device of claim 7, wherein the larger second non-display touch sensitive surface does not include the first non-display touch sensitive surface.

11. The input device of claim 7, wherein the first non-display touch sensitive surface of the input device ignores detection of the touch of the user while the first and second non-display touch sensitive surfaces are in the second state.

12. The input device of claim 7, wherein the second non-display touch sensitive surface ignores detection of the touch of the user while the first and second non-display touch sensitive surfaces are in the first state.

13. A method comprising:
determining whether a pivoting input device of an electronic assembly is in a first state or a second state;
detecting touch of a user of the electronic assembly on a first non-display touch sensitive surface of the input device responsive to determining that the input device is in the first state;
detecting touch of the user of the electronic assembly on a second non-display touch sensitive surface on an opposite side of the input device than the first non-display touch sensitive surface responsive to determining that the input device is in the second state; and
detecting touch of the user of the electronic assembly on a third non-display touch sensitive surface positioned adjacent to the second non-display touch sensitive surface, responsive to determining that the input device is in the second state, to provide a larger touch sensitive area relative to a touch sensitive area of the first non-display touch sensitive surface when the input device is in the first state.

14. The method of claim 13, wherein the input device transitions from the first state to the second state by pivoting the first non-display touch sensitive surface.

15. The method of claim 13, further comprising changing information presented on a display of the electronic assembly responsive to detecting the touch of the user on the first non-display touch sensitive surface or on the second non-display touch sensitive surface.

16. The assembly of claim 1, wherein the third non-display touch sensitive surface is separate from the first and second non-display touch sensitive surfaces and is active to detect touch while the second non-display touch sensitive surface is active to detect touch.

17. The assembly of claim 16, wherein the second non-display touch sensitive surface of the input device faces the third non-display touch sensitive surface while the input device is in the first state.

18. The input device of claim 7, wherein the third non-display touch sensitive surface is separate from the first and second non-display touch sensitive surfaces and is active to detect touch while the second non-display touch sensitive surface is active to detect touch.

19. The input device of claim 18, wherein the second non-display touch sensitive surface faces the third non-display touch sensitive surface while in the first state.

* * * * *